United States Patent
Jonsson et al.

(10) Patent No.: US 6,970,476 B1
(45) Date of Patent: Nov. 29, 2005

(54) EFFICIENT HEADER COMPRESSION CONTEXT UPDATE IN PACKET COMMUNICATIONS

(75) Inventors: Lars-Erik Jonsson, Lulea (SE); Hans Hannu, Lulea (SE); Krister Svanbro, Lulea (SE); Zolt Haraszti, Kista (SE); Anders Furuskär, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 896 days.

(21) Appl. No.: 09/671,371

(22) Filed: Sep. 26, 2000

Related U.S. Application Data

(60) Provisional application No. 60/188,284, filed on Mar. 7, 2000.

(51) Int. Cl.[7] .............................................. H04L 12/28
(52) U.S. Cl. ...................... 370/401; 370/465; 370/477
(58) Field of Search ................................ 370/252, 349, 370/401, 402, 394, 410, 522–524, 474, 477, 370/392, 465

(56) References Cited

U.S. PATENT DOCUMENTS

| | | | |
|---|---|---|---|
| 5,245,616 A | | 9/1993 | Olson ........................... 371/32 |
| 5,799,013 A | * | 8/1998 | Seshadri et al. ............. 370/342 |
| 5,987,022 A | * | 11/1999 | Geiger et al. ............... 370/349 |
| 6,198,735 B1 | * | 3/2001 | Pazhyannur et al. ........ 370/349 |
| 6,542,931 B1 | * | 4/2003 | Le et al. ...................... 709/228 |
| 6,608,841 B1 | * | 8/2003 | Koodli ......................... 370/474 |

FOREIGN PATENT DOCUMENTS

WO    WO 99/17489    4/1999

OTHER PUBLICATIONS

Khiem et al.; *Efficient and Robust Header Compression For Real-Time Services*; Nokia Research Center; Wireless Communications and Networking Con 2000; WCNC IEEE; Sep. 23-28, 2000; pp. 924-928.
PCT Search Report; PCT/SE 01/00440; Mailed Jul. 12, 2001.

* cited by examiner

*Primary Examiner*—Alpus H. Hsu
*Assistant Examiner*—Daniel Ryman

(57) ABSTRACT

In packet communications that utilize header compression/decompression, relatively fast and reliable header compression context updates can be accomplished with relatively low overhead by: sending anticipatory context update requests before decompressor context invalidation is detected; sending redundant context update requests; and sending redundant context updates. Transmission parameters associated with both context update requests and context updates can be controlled appropriately to improve their chances for delivery, and needless context update requests can be identified and ignored at the header compression side.

18 Claims, 4 Drawing Sheets

EFFICIENT HEADER COMPRESSION CONTEXT UPDATE IN PACKET COMMUNICATIONS

This application claims the benefit of provisional application Ser. No. 60/188,284 filed Mar. 7, 2000.

FIELD OF THE INVENTION

The invention relates generally to packet communications and, more particularly, to header compression in packet communications.

BACKGROUND OF THE INVENTION

Due to the tremendous success of the Internet, it has become a challenging task to make use of the Internet Protocol IP (see, e.g., Jon Postel, *Internet Protocol*, DARPA RFC 791, September 1981, incorporated herein by reference) over all kind of links. However, because the IP protocols were designed for wired links with high bandwidth capabilities, and because packet headers of the IP protocols are rather large, it is not always a simple task to use IP protocols with narrow band links, for example cellular links. If we consider the scenario when the IP protocols are used for real-time data, for example ordinary speech, the User Datagram Protocol UDP (see, e.g., Jon Postel, *User Datagram Protocol*, DARPA RFC 768, August 1980, incorporated herein by reference) and the Real-Time Transport Protocol RTP (see, e.g, Henning Schulzrinne, Stephen L. Casner, Ron Frederick and Van Jacobson, *RTP: A Transport Protocol for Real-Time Applications*, IETF RFC 1889, IETF Audio/Video Transport Working Group, January 1996, incorporated herein by reference) are applied on top of IP. Together they require a total amount of 40 header octets (IP 20, UDP 8 and RTP 12 octets). If we combine these header requirements with ordinary speech usage, which may have frame sizes as low as 15–20 octets, the header part will disadvantageously represent more than 70% of the packet.

The term header compression (HC) comprises the art of transparently minimizing the necessary bandwidth for information carried in headers on a per-hop basis over point-to-point links. Header compression takes advantage of the fact that some fields in the headers are not changing within a flow, and that most header changes are small and/or predictable. Conventional header compression schemes make use of these facts and send static information only initially, while changing fields are sent either as uncompressed values (e.g., for completely random information) or as differences (or deltas) from packet to packet, the latter typically referred to as difference (or delta) encoding.

Conventional header compression/decompression schemes are often realized using state machines, and the challenging task is to keep the compressor and de-compressor states (or contexts) consistent with each other.

In general, there are two different conventional techniques to keep the de-compressor context updated. The first technique uses periodic refreshes wherein absolute header data is sent. An advantage of this solution is that its performance is not affected by the round-trip-time (RTT) of the link, due to the fact that no messages are sent from the de-compressor to the compressor. This means that it also works over simplex links. On the other hand, there are a number of disadvantages with periodic refreshing. For example, the average header overhead will be high due to the high number of large refresh headers, most of which are unnecessary. On the other hand, if the header refresh rate is too low, the number of lost packets will be high if errors on the link are common.

The other common way of keeping the context updated is to let the compressor send refreshing information (i.e., absolute header data) only when requested by the de-compressor. This requires a duplex link but reduces the average header overhead because no unnecessary updates are performed. Provided that the RTT is small, this solution also reduces the number of lost packets due to inconsistent context states after a link error. Due to the fact that several header fields change on a packet-to-packet basis in real-time traffic (e.g., real-time speech), this solution is preferable for real-time applications. The obvious disadvantages are dependence on the back channel of the duplex link, sensitivity to lost packets on the link, and the high number of consecutive lost packets that will occur in case of an invalid context (and associated refresh request) when the RTT is high.

For all header compression schemes, two measures describe their performance. Compression efficiency describes how much the headers are compressed. This can be expressed by the average or maximal header size, combinations of both, or in other ways. Robustness describes how well the scheme handles loss on the link. Will loss of a packet make the header contexts inconsistent resulting in a large number of subsequent lost packets?

Thus, header compression schemes seek a balance between compression efficiency and robustness. More robustness requires more header overhead, while more efficiency results in less robustness. Efficient schemes therefore typically have some weakness in their robustness, meaning that context updates on request are needed.

Currently, there exist a number of different conventional header compression schemes. In fact, they are not really different schemes but different development states of the same one. The earliest proposals (see, e.g., Van Jacobson, *Compressing TCP/IP Headers for Low-Speed Serial Links*, IETF RDC 1144, IETF Network Working Group, February 1990, incorporated herein by reference) handle only compression of TCP (see, e.g., Jon Postel, *Transmission Control Protocol*, DARPA RFC 761, January 1980, incorporated herein by reference) flows, while ideas have later evolved to make compression of UDP and also RTP headers possible (see, e.g., Mikael Degermark, Björn Nordgren and Stephen Pink, *IP Header Compression*, IETF RFC 2507, IETF Network Working Group, February 1999, incorporated herein by reference; and Steven Casner and Van Jacobson, *Compressing IP/UDP/RTP Headers for Low-Speed Serial Links*, IETF RFC 2508, IETF Network Working Group, February 1999, incorporated herein by reference).

There are also new proposals like the ROCCO scheme (Lars-Erik Jonsson, Mikael Degermark, Hans Hannu, Krister Svanbro, *Robust Checksum-based Header Compression (ROCCO)*, Internet Draft (work in progress), October 1999, incorporated herein by reference) under development for increased robustness. Up until now, little attention has been paid to context update procedures. The methods used have usually been very simple and unsophisticated. One of the reasons for that is probably that these procedures in general are not subject to standardization. Also, context updates on request have been considered only as fall-back solutions. However, when header compression is used over error-prone links with long round-trip times and for data with real-time requirements, sophisticated context update procedures would make significant improvements to the performance.

It is desirable in view of the foregoing to update an invalidated decompressor context as fast as possible with a minimal increase in header overhead. This can be divided into five parts: (1) when to start sending update requests; (2) how to make sure that update requests are delivered to the compressor; (3) what to include in update requests; (4) how to react to update requests received at the compressor side; (5) how to make sure that context updates are delivered to the de-compressor; and (6) how to verify a correct context.

The invention provides for relatively fast and reliable context updates with relatively low overhead by; sending anticipatory context update requests before decompressor context invalidation is detected; sending redundant context update requests; and sending redundant context updates. Transmission parameters associated with both update requests and updates can be controlled appropriately to improve their chances for delivery, and needless update requests can be identified and ignored at the header compression side.

DETAILED DESCRIPTION

Figure 1:
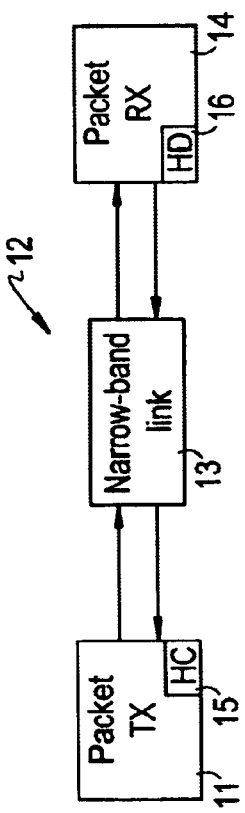
FIG. 1 diagrammatically illustrates an exemplary packet communication system in which the present invention may be implemented.

FIG. 1 diagrammatically illustrates an exemplary packet communication system which can implement the present invention. A packet transmitting station 11 transmits data packets across a packet communication channel 12 to a packet receiving station 14. The packet transmitting station 11 includes a header compressor (HC) 15 for providing header compression, and the packet receiving station 14 includes a header decompressor (HD) 16 for providing header decompression. The packet receiving station 14 can selectively transmit a context update request (CUR) across the channel 12 to the packet transmitting station 11. The packet transmitting station 11 can then respond to the context update request by transmitting a context update (CU) across the channel 12 to the packet receiving station 14.

In the example of FIG. 1, the channel 12 includes a narrow-band link 13, for example a radio link. In such an example, the packet transmitting station 11 can be a radio transmitting station, for example a fixed or mobile station operating in a cellular telecommunications network. Similarly, where the narrow-band link 13 is a radio link, the packet receiving station 14 can be, for example, a fixed or mobile radio receiving station operating in a cellular telecommunications network.

Although the above-described use of context update requests and corresponding context updates is generally well known in the art, the manner in which context updates are requested and then provided can significantly affect the compression efficiency of a given header compression scheme. According to the present invention, and as described in detail below, context updates are requested and provided in such a manner that deficiencies in the robustness of the header compression scheme are at least partially concealed.

Figure 2:
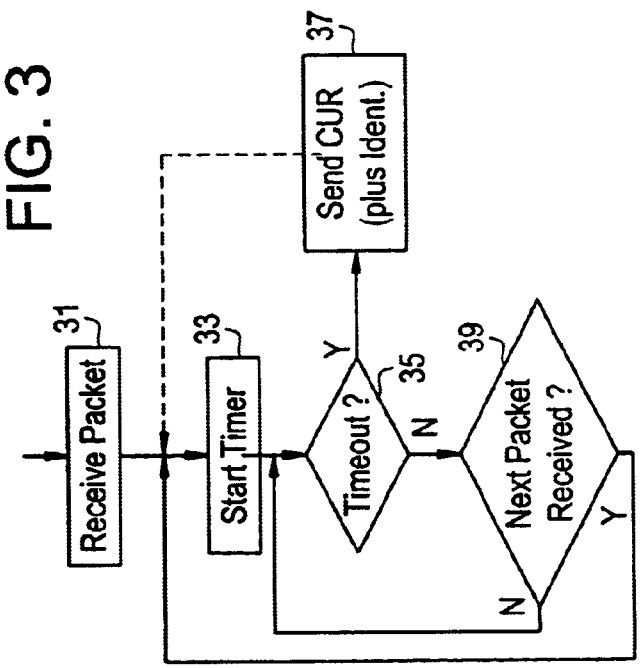
FIG. 2 diagrammatically illustrates pertinent portions of exemplary embodiments of the packet receiving station of FIG. 1.

FIG. 2 diagrammatically illustrates pertinent portions of exemplary embodiments of the packet receiving station 14 of FIG. 1. The embodiments of FIG. 2 can, for example, speed up the context update procedure during a long burst of lost packets on a packet communication channel having a large round-trip time. In the embodiment of FIG. 2, a timer 23 is provided to indicate the elapsed time since the last packet in a given packet flow was received. Due to the fact that the normal packet interval (i.e., the normal time between receipt of consecutive packets in the packet flow) is usually known, if another packet is not received within this time interval, then this may be an indication of a packet loss and impending invalidation of the packet receiving station's header compression context.

In FIG. 2, an incoming packet section 21 receives incoming packets from the packet communication channel, and can process the incoming packets in any desired conventional manner, including providing header decompression. According to the present invention, the incoming packet section 21 is coupled to the timer 23 for signaling the timer each time a packet is received from the channel. A packet received signal 22 causes the timer 23 to load the packet interval value and begin timing. If the packet interval time elapses before another packet is received at the incoming packet section (and signaled at 22 to timer 23), the timer 23 provides a timeout signal to a context update request generator 25.

The context update request generator 25 responds to the timeout signal by generating an appropriate context update request, and providing the context update request to an outgoing packet section 27. This request is made based on the possibility of context invalidation, even though such invalidation has not yet been actually ascertained. The outgoing packet section 27 can process outgoing packets in any desired conventional fashion, including producing a suitable packet that will carry the generated context update request. The outgoing packet section 27 outputs outgoing packets, including those containing context update requests, to the packet communication channel. In some embodiments, the context update request generated at 25 can include an identifying indication that the context update request has been generated early, in anticipation of an expected decompressor context invalidation (e.g., in view of a longer-than-expected interval between receipt of consecutive packets in the packet flow).

As shown at 26 in FIG. 2, the context update request generator 25 can also be triggered to produce a CUR in response to any other desired condition(s), for example a detected decompressor context invalidation.

Figure 3:
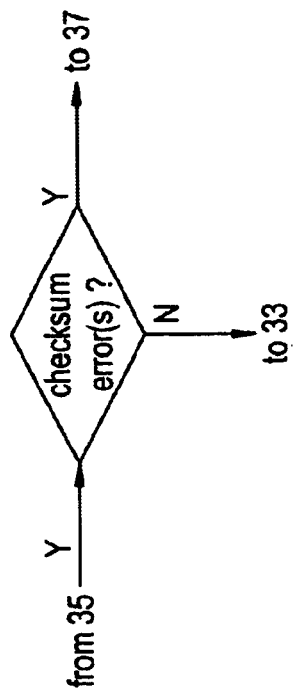
FIG. 3 illustrates exemplary operations which can be performed by the packet receiving station of FIG. 2.

FIG. 3 illustrates exemplary operations which can be performed by the packet receiving station of FIG. 2. After a packet from a given packet flow is received at 31, the timer is started at 33. The timer operates until either a timeout occurs at 35, or the next packet is received (and optionally identified as an early request) at 39. If a timeout occurs at 35 before the next packet is received at 39, then a context update request is sent at 37 (and optionally identified as an early request) On the other hand, if the next packet is received at 39 prior to the occurrence of a timeout at 35, then the timer is started again at 33. In some embodiments, the timer can be restarted at 33 after sending a context update request at 37, as indicated by the broken line in FIG. 3. Such embodiments provide for the possibility of sending a series of redundant context update requests if the timer times out more than once before the next packet is received.

Figure 3A:
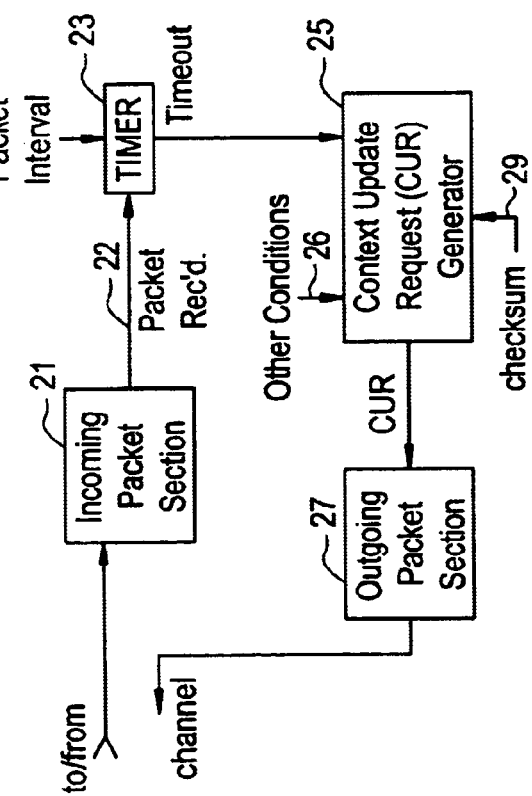
FIG. 3A illustrates an alternative operation that can be performed by the packet receiving station of FIG. 2.

In some embodiments, information from lower layers can be provided to the context update request generator 25, to help distinguish between a long packet loss and inactivity in the packet flow. For example, a checksum error at 29 in FIG. 2 would indicate that a timeout from timer 23 means that a long packet loss has occurred and thus a context update request is needed. However, lack of a checksum error at 29 would indicate that the timeout is due to inactivity in the packet flow, so no context update request would be needed. The operation of such embodiments is also illustrated in FIG. 3A, when considered with FIG. 3.

Figure 4:
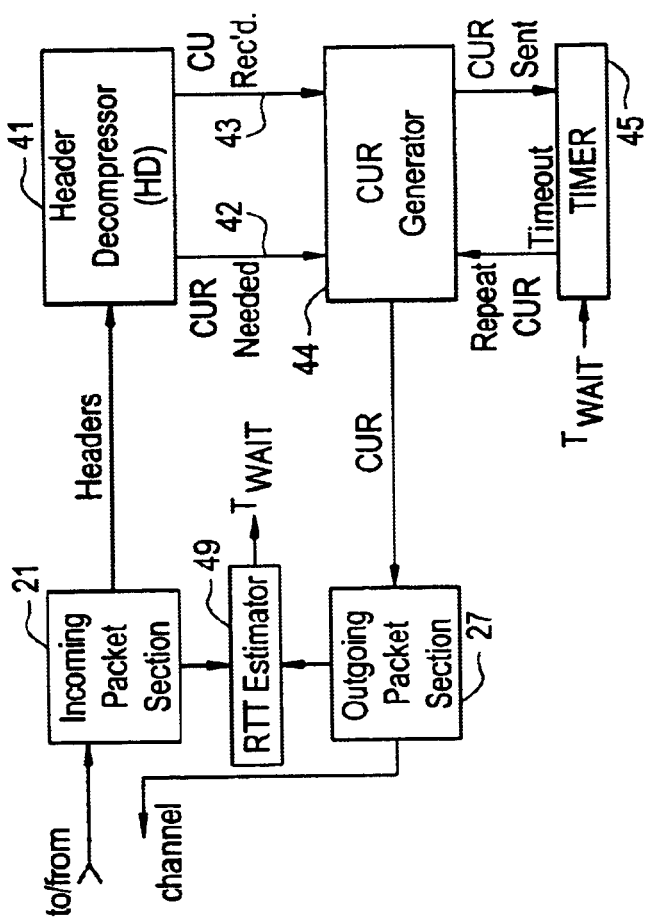
FIG. 4 diagrammatically illustrates pertinent portions of another exemplary embodiment of the packet receiving station of FIG. 1.

FIG. 4 diagrammatically illustrates pertinent portions of another exemplary embodiment of the packet receiving station of FIG. 1. In FIG. 4, the incoming packet section 21 provides to a header decompressor 41 the headers of the incoming packets. The header decompressor 41 can use conventional decompression techniques to decompress the headers. The header decompressor 41 provides control signals 42 and 43 to a context update request generator 44. In particular, the signal 42 indicates that the header decompressor has determined that a context update request is needed, for example, in response to context invalidation in one or more header fields. The signal 43 is produced by the header decompressor 41 when a context update has been received.

A timer 45 is coupled to the context update request generator 44, and receives therefrom a CUR sent signal indicating that a needed context update request has been sent. In response to the CUR sent signal, the timer 45 loads a value $T_{wait}$ and begins timing based on that value. When the time $T_{wait}$ expires, the timer 45 outputs a timeout signal to a repeat CUR input of the context update request generator 44. With this arrangement, the context update request generator 44 generates a context update request in response to the signal 42, and can generate a sequence of additional redundant context update requests that are timewise separated by the time $T_{wait}$, which sequence continues until a context update is received. The sequence of context update requests output by the context update request generator 44 can be processed by the outgoing packet section 27 in generally the same manner as described above with respect to FIG. 2.

Figure 5:
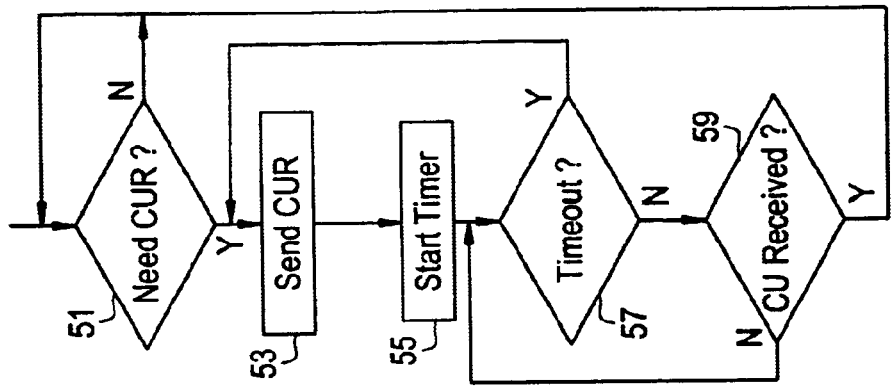
FIG. 5 illustrates exemplary operations which can be performed by the packet receiving station of FIG. 4.

FIG. 5 illustrates exemplary operations which can be performed by the packet receiving station of FIG. 4. When it is determined at 51 that a context update request is needed, the context update request is sent at 53. Upon sending the context update request at 53, the timer is started at 55. It is thereafter determined whether a timeout occurs at 57 before the requested context update is received at 59. If so, then another context update request is sent at 53, and the steps at 55 through 59 are repeated. On the other hand, if the requested context update is received at 59 before a timeout occurs at 57, then an indication of another needed context update request is awaited at 51.

The conditions described above relative to FIGS. 4 and 5 for triggering a context update request are further examples of the "other conditions" mentioned above and illustrated at 26 in FIG. 2. Also, the "CUR needed" signal at 42 in FIG. 4 can, in some embodiments, be the timeout signal from a packet interval timer such as shown at 23 in FIG. 2 and described above.

By periodically repeating the context update requests in FIGS. 4 and 5, the chances of successfully updating the context are increased. The amount of time, $T_{wait}$, to wait before repeating the context update request can be based on RTT estimations. By so doing, unnecessary requests can be avoided, which saves bandwidth in the packet channel.

The value of $T_{wait}$ can be determined from parameters such as RTT, channel capacity and the desired quality of the service. If $T_{wait}$ is set equal to the RTT, then unnecessary context update requests are avoided but, if the channel is bad, the quality of service will deteriorate. If there is a large amount of available bandwidth, it could be better to set $T_{wait}$ to an amount smaller than the RTT. The time $T_{wait}$ should preferably be some fraction of the estimated RTT, for example 50% of RTT. The value of $T_{wait}$ can be selected in view of the aforementioned parameters and considerations. In addition, or alternatively, the value of $T_{wait}$ can be empirically determined by experimentation in view of the desired quality of service and the expected channel conditions (e.g., RTT and capacity).

The RTT estimate used to determine $T_{wait}$ can be determined in any desired manner, one example of which follows. When the packet receiving station transmits a packet containing a context update request, the outgoing packet section 27 can note and store the current time. When the corresponding context update packet is received by the packet receiving station, the incoming packet section 21 can note and store the current time. Then, an RTT estimator 49 coupled to the incoming packet section 21 and the outgoing packet section 27 can compute the RTT estimate as the difference between the time at which the context update request packet was sent and the time at which the corresponding context update packet was received. A plurality of RTT estimates can be calculated in this manner as requests are sent and corresponding updates received, and the RTT estimates can be used for statistical processing, for example, calculating the mean value of the RTT estimates. This mean value can then be used by the RTT estimator to select $T_{wait}$.

Figure 6:
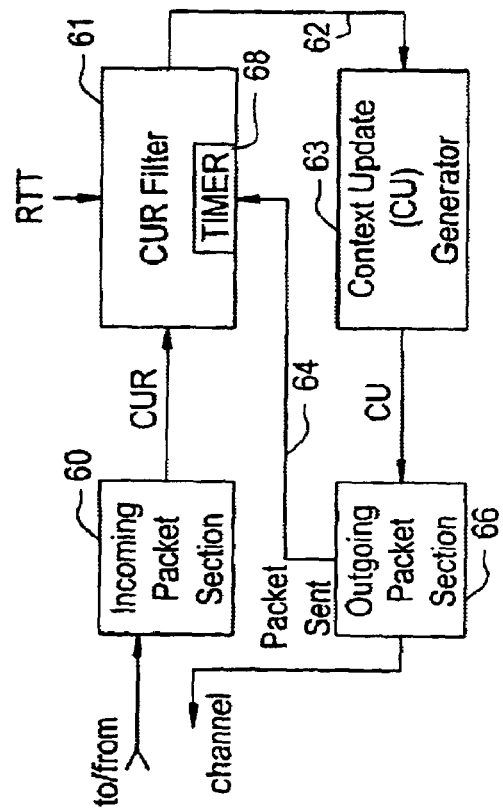
FIG. 6 diagrammatically illustrates pertinent portions of an exemplary embodiment of the packet transmitting station of FIG. 1.

FIG. 6 illustrates pertinent portions of an exemplary embodiment of the packet transmitting station of FIG. 1. In the packet transmitting station embodiment of FIG. 6, an incoming packet section 60 forwards received context update requests to a context update request filter 61 (provided, for example, in the HC 15 of FIG. 1). The context update request filter 61 determines whether or not a received context update request should trigger a context update. If the filter 61 determines that a context update should be generated in response to the received context update request, an indication of such determination is signaled at 62 to a context update generator 63 (provided, for example, in the HC 15 of FIG. 1). The generated context update (CU) is provided by the generator 63 to an outgoing packet section 66, which inserts the context update into an outgoing packet.

The context update request filter 61 can determine whether or not to send a context update based on knowledge of the RTT and the time at which the last packet was sent to the station that generated the context update request. As shown at 64 in FIG. 6, the outgoing packet section 66 signals the context update request filter 61 when each outgoing packet is sent out, and the context update request filter 61 also receives as input information indicative of the RTT. This RTT information can be provided from the packet receiving station, which can estimate RTT in the exemplary manners described above.

The context update request filter 61 of FIG. 6 can be used, for example, to filter out and ignore an unnecessary early context update request sent by the packet receiving station of FIG. 2. For example, the packet receiving station of FIG. 2 could send an unnecessary early context update request in a situation where the packet transmitting station simply did not send (or has not sent) a packet for a period of time longer than the packet interval applied to the timer 23 of FIG. 2. The context update request filter request 61 can include a timer 68 similar to that of FIG. 2 for monitoring the elapsed time between the packets that are sent in a given packet flow. The timer 68 is coupled to the packet sent signal at 64. As described above, a packet containing an early context update request as generated in FIG. 2 can also contain information explicitly identifying the context update request as an early request. Thus, if such a context update request is received by the filter 61 of FIG. 6, it is easily identified, and can be ignored if the filter 61 determines from its timer 68 that the received early context update request was generated unnecessarily (e.g., due to a long idle period between packet transmissions).

On the other hand, if a context update request produced by the packet receiving station of FIG. 2 is not explicitly identified as an early request, the context update request filter 61 may nevertheless be able to identify such an early context update request. In particular, if the timer in filter 61 indicates that more than one RTT has elapsed since the last packet was sent in the packet flow, the filter 61 can consider the context update request to be an unnecessary early request that can be ignored.

The context update request filter 61 of FIG. 6 can also filter out and ignore a context update request if it is determined that the context update request is a redundant request which has already been responded to with a context update. Examples of such redundant requests are described above, and other examples are described below.

Figure 7:
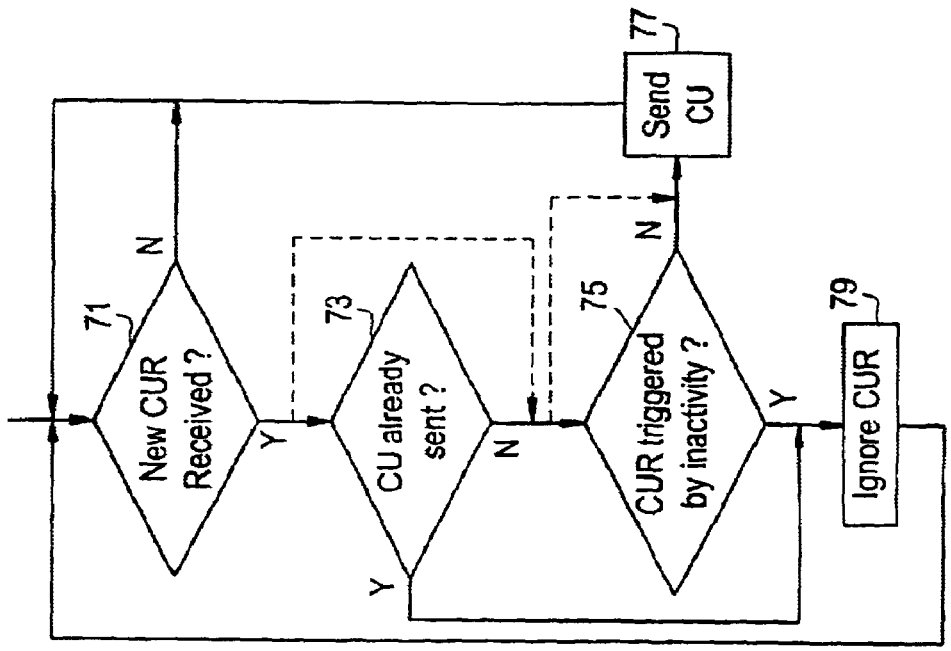
FIG. 7 illustrates exemplary operations which can be performed by the packet transmitting station of FIG. 6.

FIG. 7 illustrates exemplary operations which can be performed by the packet receiving station of FIG. 6. When a context update request is received at 71, it is thereafter determined at 73 whether a corresponding context update has already been sent. If so, then the received context update request is merely a redundant request, and is ignored at 79. If it is determined at 73 that a context update corresponding to the received request has not been sent, it is then determined at 75 whether or not the context update request is an early request triggered by inactivity of the packet transmitting station. If it can be determined at 75 that the context update request was triggered by inactivity at the packet transmitting station, then the context update request is ignored at 79, and the next context update request is thereafter awaited at 71. Otherwise, a corresponding context update is sent at 77, and the next context update request is thereafter awaited at 71.

As shown by broken lines in FIG. 7, the decision block 73 can be omitted in embodiments that do not employ redundant context update requests, and the decision block at 75 can be omitted in embodiments that do not employ early context update requests.

If context control information such as context update requests and their corresponding context updates are sent over lossy links, it is desirable to reduce the transmission error probability associated with such transmissions, as compared to other less critical transmissions. This transmission error probability can be reduced using a variety of techniques according to the present invention.

As one example, a context update request and the corresponding context update can be repeated in N consecutive packets, or with a suitable frequency F. Alternatively, the repetition in N consecutive packets can itself be repeated with frequency F. The values of N and/or F can be chosen so that the probability of failure to deliver the request or the update is reduced to a suitable level below that of less critical types of communications on the link. Suitable values of N or F can be determined, for example, empirically, through experimentation under expected channel conditions.

If a given context update request or context update is repeated in N consecutive packets, the information in these packets can, in some embodiments, be formatted such that the N packets can be combined to form a valid request or update. This can be done, for example, with soft combining on the physical layer. In particular, several context updates may be sent in a row, each containing a fixed number of bits with information about a correct context. If several such context updates are received at the packet receiving station, a correct context update can be determined by soft combining at layer 1. When each bit is demodulated, the probability for bit error of a single bit may be decreased by taking into account the demodulated value of the corresponding bit in the previous context update. Hence, a soft combining can be performed by comparing current and previous context updates to secure a correctly received context update. As another example, this could be done at a logical level with a simple majority decision. If, for example, two out of three context updates say that the value of a header field (for example the type of service, or TOS, field) is 10, and the third context update says that the value is 20, then the value of 10 should be chosen. This procedure of majority decisions may be applied at the bit level, the field level, or on the level of entire headers. This choice of level involves only the desired size of the set of bits upon which the majority decision is to be based.

If the packets are transmitted in a wireless system or in any system with variable transmission output power, such variable transmission power can also be utilized. The output power for the packets containing context update requests or context updates can be raised (relative to less critical types of communication transmissions) by a factor Kp, so that the probability of failing to effect delivery of the context update request or the context update is reduced to a desired level below that of less critical types of communications on the link. The factor Kp can be determined, for example, empirically through experimentation.

If the packets are transmitted in a system that utilizes channel coding, the channel encoding rate R=useful information bit rate/channel decoded data bit rate) can be decreased (relative to less critical types of communication transmissions) until the probability of failure to deliver the context update request or the context update is reduced to a suitable level below that of less critical types of communications on the link. The desired encoding rate R can be determined, for example, empirically through experimentation.

In some embodiments, the aforementioned parameters N, F, Kp and R can also be made adaptive to the channel quality. Channel quality can be measured in conventional terms such as, for example, bit error rate, packet loss rate, etc. The parameters N, F, Kp and R can be continuously adjusted so that the probability of failure to deliver context update requests and context updates is kept to a desired level. The adaptability of the aforementioned parameters to the channel quality measures can be implemented, for example, using a lookup table wherein the parameters N, F, Kp and R are indexed against conventionally available channel quality measures such as bit error rate, packet loss rate, etc. The information in such lookup tables can be determined, for example, empirically through experimentation.

Figure 8:
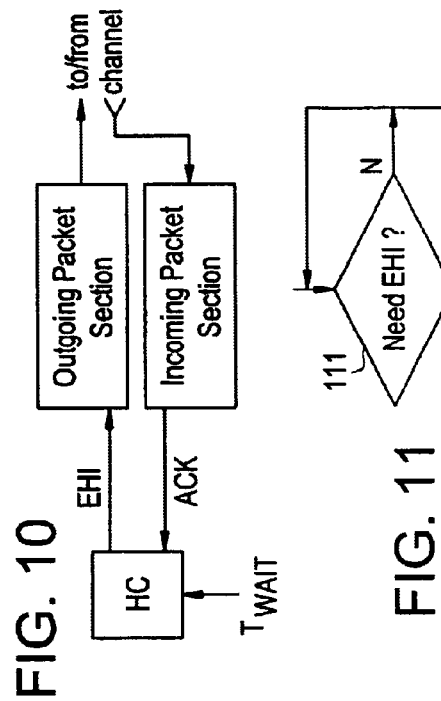
FIG. 8 diagrammatically illustrates pertinent portions of exemplary embodiments of the packet transmitting station of FIG. 1 and the packet receiving station of FIG. 1.

FIG. 8 illustrates pertinent portions of exemplary embodiments of the packet transmitting station and the packet receiving station of FIG. 1. In FIG. 8, a transmission parameter generator 81 is triggered when transmission of context control information such as a context update request or a context update is initiated at the input of a context control information generator 82, such as a context update request generator or a context update generator. In response to initiation of the context update request (or context update), the transmission parameter generator produces one or more of the aforementioned parameters N, F, Kp and R. As shown in FIG. 8, the parameters N and F are provided to the context control information generator 82, while the parameter Kp is provided to a power amplifier, and the parameter R is provided to a channel coder. FIG. 8 also illustrates in broken line the exemplary alternative of providing channel quality information as an input to the transmission parameter generator, producing the transmission parameter(s) as a function of the channel quality information, and varying the transmission parameter(s) in response to variations in the channel quality.

Figure 9:
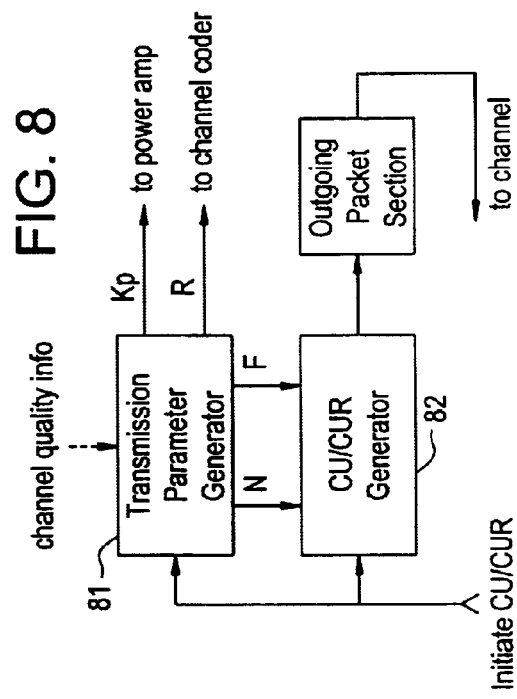
FIG. 9 illustrates exemplary operations which can be performed by the embodiments of FIG. 8.

FIG. 9 illustrates exemplary operations which can be performed by the embodiments of FIG. 8. After it is determined at 91 that a context update request (or context update) has been initiated, one or more of the transmission parameters are obtained and applied at 92. As mentioned above, in various embodiments, any of the transmission parameters illustrated in FIGS. 8 and 9 can be used alone or in any desired combination with any other parameter(s). It should also be noted that any (or any desired combination) of the transmission parameters of FIGS. 8 and 9 can be used in conjunction with the context update requests produced in FIGS. 2–5 and/or the context updates produced in FIGS. 6 and 7.

Figure 10:
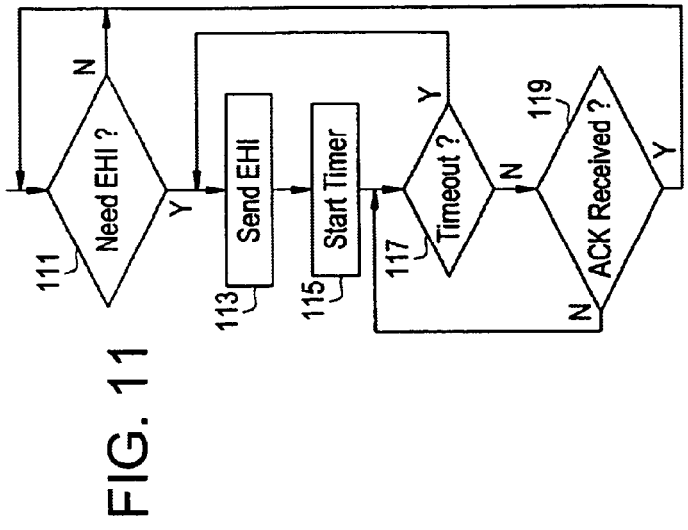
FIG. 10 diagrammatically illustrates pertinent portions of another exemplary embodiment of the packet transmitting station of FIG. 1.

Pertinent portions of a further exemplary packet transmitting station are illustrated in FIG. 10. In some instances, the header compressor HC sends to the header decompressor in the packet receiving station header information that is enhanced relative to typical compressed header information. As one example of such enhanced header information (EHI), prior to commencing header compression operations, full headers must typically be sent to the packet receiving station until the header decompressor HD acknowledges that its context is properly initialized to begin receiving compressed headers. As other examples of enhanced header information, although changes in header field values such as time stamp field values and IPv4 (IP version 4) ID field values are normally predictable at the header decompressor without receiving any delta values therefor, if one of these fields changes by an unusually large amount, then delta values are typically transmitted for those fields until an acknowledgment (ACK) is received from the header decompressor.

The above described use of enhanced header information EHI (e.g., full headers before compression is commenced, or delta values for time stamp fields and IPv4 ID fields) is improved according to the invention as shown in FIG. 10. For example, the aforementioned amount of time $T_{WAIT}$ can be used by the header compressor HC in generally the same manner described above with respect to FIG. 4 to periodically repeat the EHI until an acknowledgment ACK is received from the header decompressor.

Figure 11:
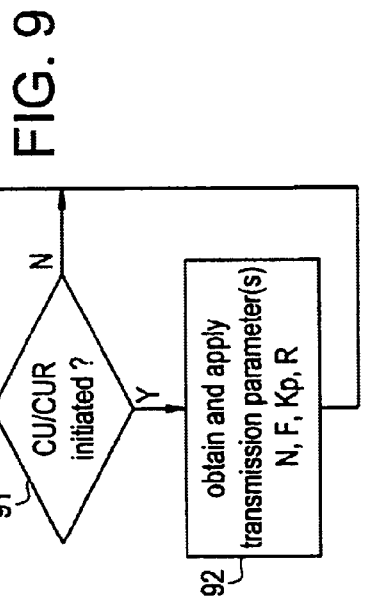
FIG. 11 illustrates exemplary operations which can be performed by the packet transmitting station of FIG. 10.

FIG. 11 illustrates exemplary operations that can be performed by the packet transmitting station pf FIG. 10. Comparing FIG. 11 to FIG. 5, it can be seen that the operations at 111, 113, 115, 117 and 119 are generally analogous to the respective operations at 51, 53, 55, 57 and 59 in FIG. 5, except EHI is sent instead of a CUR, and ACK is received instead of CU.

It should also be noted that any (or any desired combination) of the transmission parameters of FIGS. 8 and 9 can be used in conjunction with the enhanced header information EHI produced in FIGS. 10–11. It should also be clear that these transmission parameters are applicable to EHI whether or not EHI is periodically repeated based on $T_{wait}$.

It will be evident to workers in the art that the inventive embodiments illustrated in FIGS. 1–11 above can be readily implemented, for example, by suitably modifying software, hardware or both in packet data processing portions of conventional packet transmitting and receiving stations.

Although exemplary embodiments of the present invention have been described above in detail, this does not limit the scope of the invention, which can be practiced in a variety of embodiments.

What is claimed is:

1. A method of transmitting from a first packet communication station to a second packet communication station information including context control information, the context control information used to maintain consistency between header compression contexts respectively associated with the first and second packet communication stations, comprising:

transmitting information other than context control information between the first and second packet communication stations according to a first transmission parameter;

determining that context control information is to be transmitted from the first packet communication station to the second packet communication station;

in response to the determination that context control information is to be transmitted from the first packet communication station to the second packet communication station, providing a second transmission parameter according to which the context control information can be transmitted from the first packet communication station to the second packet communication station with a probability of delivery that exceeds a probability of delivery associated with said step of transmitting information other than context control information according to the first transmission parameter; and transmitting the context control information from the first packet communication station to the second packet communication station according to the second transmission parameter, wherein the first or second transmission parameter are selected from the group consisting of a factor indicating output power, channel coding rate, number of consecutive packets, and frequency of broadcasting the number of consecutive packets.

2. The method of claim 1, wherein said second transmission parameter specifies that the context control information is to be transmitted from the first packet communication station to the second packet communication station in a plurality of consecutively transmitted packets.

3. The method of claim 2, wherein each of the consecutively transmitted packets includes all of the context control information.

4. The method of claim 3, wherein the context control information includes a context update request, further comprising receiving the context update request at the second packet communication station, determining whether a context update corresponding to the received context update request has already been sent from the second packet communication station to the first packet communication station, and ignoring the received context update request if a corresponding context update has already been sent from the second packet communication station to the first packet communication station.

5. The method of claim 1, wherein the context control information includes one of a context update and a context update request.

6. The method of claim 1, wherein the second transmission parameter specifies that the context control information is to be transmitted from the first packet communication station to the second packet communication station in each of a plurality of packets respectively transmitted periodically in accordance with a predetermined frequency.

7. The method of claim 6, wherein the context control information includes a context update request, further comprising receiving a context update request at the second packet communication station, determining whether a context update corresponding to the received context update request has already been sent from the second packet communication station to the first packet communication station, and ignoring the received context update request if a corresponding context update has already been sent from the second packet communication station to the first packet communication station.

8. The method of claim 6, wherein each of the periodically transmitted packets includes all of the context control information.

9. The method of claim 1, wherein the second transmission parameter specifies that the context control information is to be transmitted from the first packet communication station to the second packet communication station at a higher power level than a power level specified by the first transmission parameter.

10. The method of claim 1, wherein the second transmission parameter specifies that the context control information is to be transmitted from the first packet communication station to the second packet communication station using a lower channel coding rate than a channel coding rate specified by the first transmission parameter.

11. An apparatus for transmitting from a first packet communication station to a second packet communication station information including context control information, the context control information used to maintain consistency between header compression contexts respectively associated with the first and second packet communication stations, comprising:

an output for transmitting information other than context control information between the first and second packet communication stations according to a first transmission parameter;

a context control information generator coupled to said output for generating context control information to be transmitted from the first packet communication station to the second packet communication station;

a transmission parameter generator having an input for receiving an indication that context control information generated by said context control information generator is to be transmitted from the first packet communication station to the second packet communication station, said transmission parameter generator operable in response to said indication for providing a second transmission parameter according to which the context control information can be transmitted from the first packet communication station to the second packet communication station with a probability of delivery that exceeds a probability of delivery associated with transmission of information other than context control information according to the first transmission parameter; and said output responsive to said second transmission parameter for transmitting the context control information from the first packet communication station to the second packet communication station according to the second transmission parameter, wherein the first or second transmission parameter is selected from the group consisting of a factor indicating output power, channel coding rate, number of consecutive packets, and frequency of broadcasting the number of consecutive packets.

12. The method of claim 11, wherein said second transmission parameter specifies that the context control information is to be transmitted from the first packet communication station to the second packet communication station in a plurality of consecutively transmitted packets.

13. The method of claim 11, wherein the second transmission parameter specifies that the context control information is to be transmitted from the first packet communication station to the second packet communication station in each of a plurality of packets respectively transmitted periodically in accordance with a predetermined frequency.

14. The method of claim 11, wherein the second transmission parameter specifies that the context control information is to be transmitted from the first packet communication station to the second packet communication station at a higher power level than a power level specified by the first transmission parameter.

15. The method of claim 11, wherein the second transmission parameter specifies that the context control information is to be transmitted from the first packet communication station to the second packet communication station using a lower channel coding rate than a channel coding rate specified by the first transmission parameter.

16. The apparatus of claim 11, wherein said output, said context control information generator, and said transmission parameter generator are provided in the first packet communication station.

17. The apparatus of claim 16, wherein the first packet communication station is a radio communication station operating in a telecommunications network.

18. The apparatus of claim 11, wherein the context control information includes one of a context update and a context update request.

* * * * *